Jan. 3, 1928.
A. H. HAAG
1,654,804
COMBINED RADIO AND TALKING MACHINE AMPLIFIER
Filed July 30, 1924   2 Sheets-Sheet 2
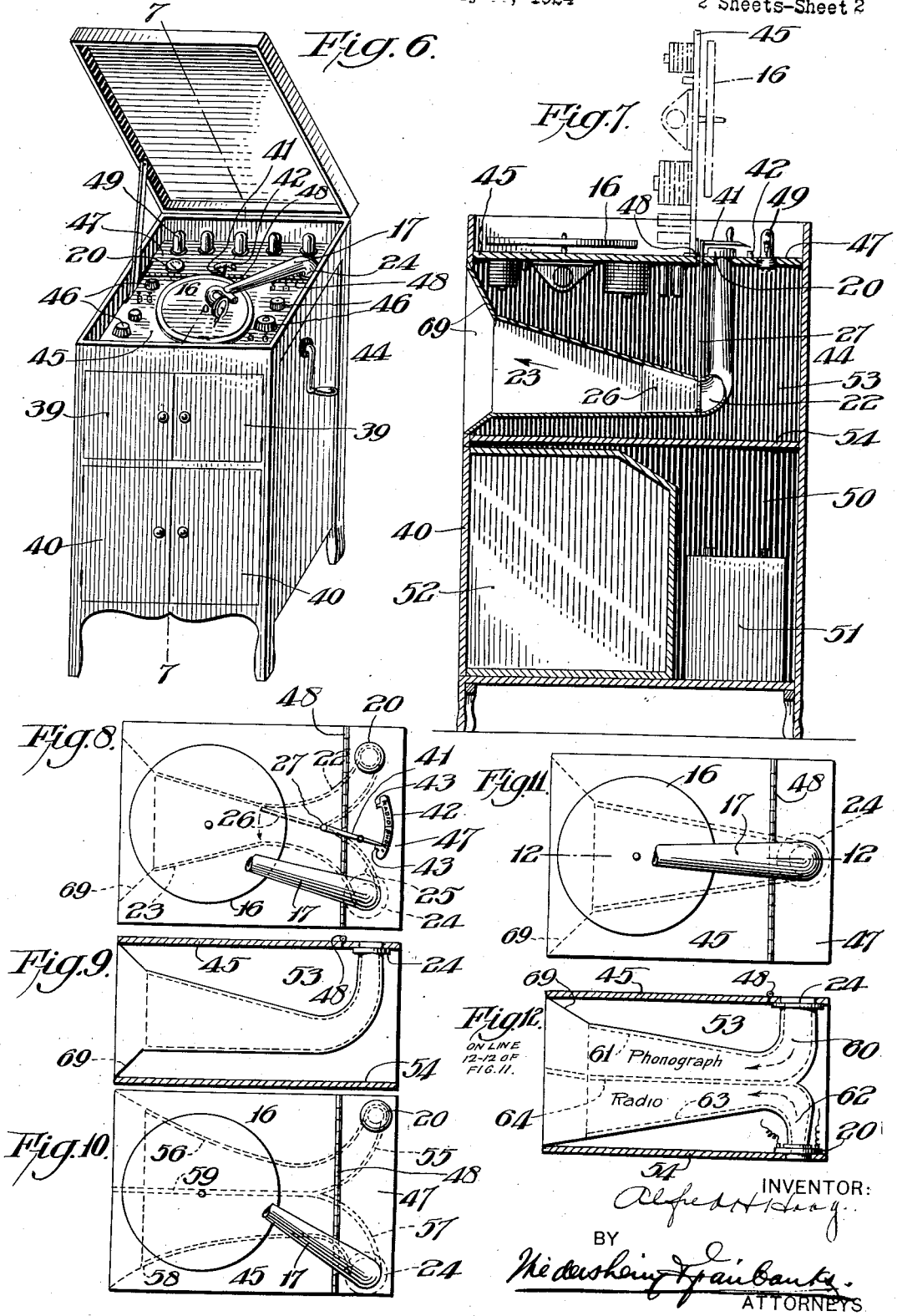

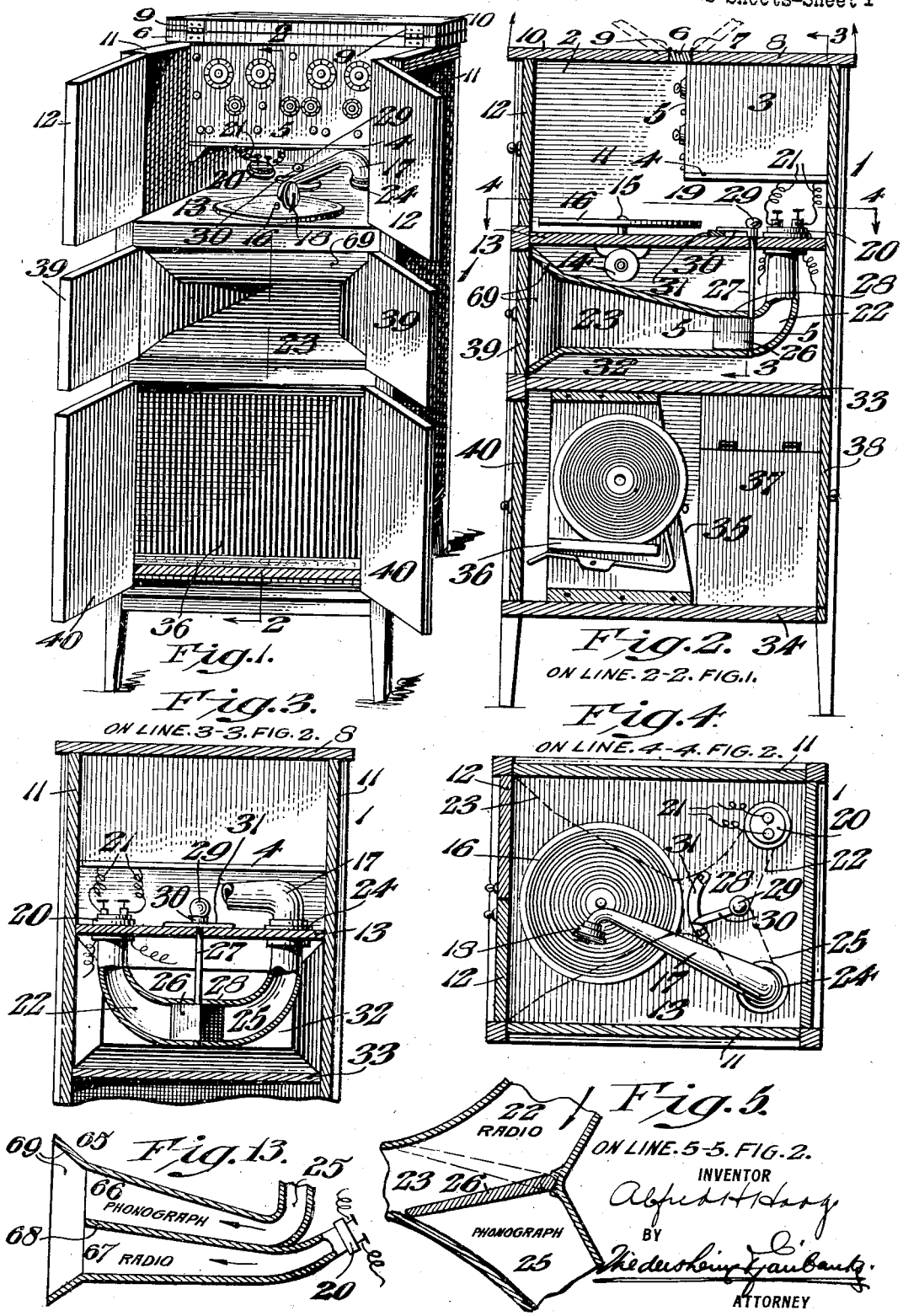

Patented Jan. 3, 1928.

1,654,804

UNITED STATES PATENT OFFICE.

ALFRED H. HAAG, OF BALTIMORE, MARYLAND, ASSIGNOR TO RADIO CORPORATION OF AMERICA, OF NEW YORK, N. Y., A CORPORATION OF DELAWARE.

COMBINED RADIO AND TALKING-MACHINE AMPLIFIER.

Application filed July 30, 1924. Serial No. 729,005.

My invention consists of a novel construction of a combined radio and talking machine amplifier and cabinet, therefor, wherein the conventional talking machine amplifier is utilized as the common sound amplifier for both the radio and the talking amplifier for the radio and the talking machine reproductions, either with or without a manually operated valvular connection common to both said radio and talking machine amplifiers.

It further consists of a novel construction of sound amplifiers common to both the radio receiving apparatus and the talking machine.

It further consists of a novel construction of a combined motor board and radio panel, which functions both as a support for the radio and talking machine elements.

It further consists of a novel construction of a valveless combined radio and talking machine amplifier.

It further consists of other novel features of construction and advantage, all as will be hereafter fully pointed out in the specification and claims appended hereto.

For the purpose of illustrating my invention, I have shown in the accompanying drawings a form thereof, which is at present preferred by me, since this will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of a combined radio and talking machine apparatus embodying my invention.

Figure 2 represents a vertical section on line 2—2 Figure 1.

Figure 3 represents a vertical section on line 3—3 Figure 2.

Figure 4 represents a transverse section on line 4—4 Figure 2.

Figure 5 represents on an enlarged scale, a transverse section on line 5—5 Figure 2.

Figure 6 represents a perspective view of another embodiment of my invention.

Figure 7 represents a vertical sectional view on line 7—7, Figure 6, showing the combined radio panel and motor board in dotted lines, in the position it assumes when turned upwardly.

Figure 8 represents a plan view of the combined radio and phonograph amplifier, showing the indicator as pointing rearwardly.

Figure 9 represents a side elevation of the common amplifier for the radio and talking machine.

Figure 10 represents a plan view of the construction seen in Figure 8, when no valve is employed.

Figure 11 represents a plan view of another embodiment of my invention.

Figure 12 represents a section on line 12—12 Figure 11, the amplifier being shown in elevation.

Figure 13 represents a sectional view of a combined radio and phonograph valveless amplifier to be hereafter referred to.

Similar numerals of reference indicate corresponding parts.

Referring to the drawings:—

My invention is applicable to either a console or an upright talking machine, and while I have for convenience of illustration shown the same in conjunction with an upright cabinet, it will be evident that the same is adapted to various other cabinets.

1 designates my novel combined radio and talking machine cabinet, the same comprising the upper or radio compartment, 2, which contains the radio receiving apparatus 3, provided with the base 4, and the front panel 5. 6 designates a transverse upper center strip, to the rear of which is hinged at 7, the back cover or lid 8, for the radio apparatus, while to the front of said strip is hinged at 9, the front cover or lid 10. The lids 8 and 10 when closed are horizontally disposed and rest upon the top edges of the side walls 11 of the cabinet, which has its upper front portion closed by the doors 12. 13 designates the motor board or upper horizontal partition, which carries the motor 14, spindle 15, turntable 16, and tone arm 17, with its sound box 18, which may be of any conventional type, and require no further description. The rear end of the tone arm is connected to its coupling 24 which is contained in an alcove 19, formed between the partitions 4 and 13, and in said alcove is also positioned at the opposite side the radio receiver 20, which communicates with the radio apparatus 3 by the wires 21. The radio receiver 20 may be supported above or below the partition 13, as may be desired, and the radio reproductions are conveyed through the flaring or conical conduit 22 to the common amplifier 23. The talking machine reproductions are conveyed from the tone arm 17, through the coupling 24, to the conical or flaring conduit 25. The conduits 22 and 25 discharge into the common amplifier 23, and the travel of the reproductions from said conduits is controlled by the valve 26, which in its simplest form comprises a plate as seen in Figure 5, which has the stem 27 projecting upwardly therefrom and passing through the top wall 28 of the amplifier 23, and the partition 13. 29 designates a finger piece, knob or button, on the upper end of the valve stem 27, from which projects laterally the finger or pointer 30, which when in the position seen in Figure 4, is in proximity to the letter R on the curved indicator bar 31, and indicates that the valve 26 is in the position seen in full lines in Figure 5, so that the radio reproductions can flow from the conduit 22 into the common amplifier 23. When the pointer 30 is moved upwardly to the letter P, seen in Figure 4, the valve 26 assumes the position seen dotted in Figure 5, so that the conduits 25 and 23 are in communication and the talking machine reproductions can then flow to the common amplifier 23. The amplifier chamber 32 is contained between the upper partition or motor board 13 and the lower partition 33, and between the latter and the bottom wall 34 is formed the chamber 35, the front of which is utilized for the record filing devices 36 and the rear for the radio batteries 37, which are accessible through the back door 38, seen in Figure 2. The front tone modulating doors 39 perform their usual function, and modulate either the radio or talking machine reproductions. The lower front doors 40, close the lower front of the cabinet. In the construction seen in Figure 4, the letters R and P can be raised above the indicator bar 31, so as to form stops to limit the movement of the pointer 30, or if desired the construction seen in Figure 8, may be employed, wherein the pointer 41, extends rearwardly, instead of forwardly as in Figures 1, 2, and 4. In Fig. 8 the indicator stop bar 42 has the stops 43 for limiting the movement of the pointer in either direction. The radio and phonograph amplifier seen in Figure 8 is substantially the same as that seen in Figures 2, 3 and 4.

44 designates another embodiment of my invention, wherein I have shown the front movable radio panel 45, as being horizontal, and the various radio controls 46 as positioned around the turntable 16. The radio panel 45 functions both as a radio panel and a motor board and carries the various radio controls 46 on its upper horizontal surface, while the coils, condensers, wiring, and other radio appurtenances are positioned on the under side of the combined horizontal radio panel and motor board, and are readily accessible when the latter is turned upwardly as indicated in dotted lines in Figure 7. The rear horizontal strip 47 is fixed and to its front edge, the rear edge of the front horizontal movable radio panel 45 is hinged at 48. It is desirable to have the audions or vacuum tubes 49 supported in fixed position, as well as the radio receiver 20, and the tone arm coupling 24, and I consequently position these elements 20 and 24 at opposite ends of the stationary strip 47, and arrange the tubes 49 in a row at the rear of said strip.

The same construction or method of radio and talking machine amplification seen in Figures 2, 3, 4, 5 and 8 may be employed in Figures 6 and 7 and need not be described again. It will be apparent that by positioning the rear end of the tone arm and its coupling 24 at one end of the stationary rear strip 47 and the radio receiver 20 at the opposite end thereof, ample room is provided for positioning the tubes 49, in alignment in their sockets on the rear strip 47 and room is also provided for the pointer 41 carried by the valve stem and indicator stop bar 42 which are positioned intermediately of the radio receiver 20 and the tone arm coupling 24, as seen in Figure 6. The amplification of the sound waves is effected by substantially the same means in Figures 2, 3, 4 and 5, as in Figure 8, except that the pointer 41 in Figure 8 extends rearwardly, whereas in the other figures it extends forwardly. The construction seen in Figures 6 and 7 provides an extremely neat and compact arrangement of the radio and talking machine elements, and the radio controls being positioned in the horizontal panel 47 are readily accessible at all times. In case any adjustment of the motor or radio accessories is desired, they can be readily handled by turning the panel 45 into the position seen dotted in Figure 7, after turning the tone arm inwardly towards the tubes 49, so that it is inside the hinge 48. The rear space 50 can be utilized for the batteries 51 and the front space 52 for record files or containers, the amplifier chamber 53 being contained between the panel or motor board 45, and the intermediate partition 54.

In the construction seen in Figure 10, I have shown the radio receiver 20 connected by the curved outwardly flaring conduit 55 to the radio amplifier, 56, while the tone arm 17 in Figure 10, is connected by the curved outwardly flaring conduit 57, with the talking machine amplifier 58, the two amplifiers being divided by the vertical partition 59. No valve is necessary or employed in this construction, and the two amplifiers are positioned side by side or in horizontal alignment. In the construction seen in Figures 11 and 12, I have shown another arrangement of valveless combined radio and talking machine amplifiers, wherein the talking machine reproductions are conveyed from the tone arm 17 through its coupling 24, into the curved flaring conduit 60 and thence to the amplifier 61. The radio reproductions are conveyed from the radio receiver 20, into the curved flaring conduit 62 to the radio amplifier 63, the two amplifiers 61 and 63, filling the spaces between the partitions 45 and 54. It will be further apparent that the flanges of the coupling 24 and radio receiver 20 as seen at the right of Figure 12 abut on the inner surfaces of the upper and lower partitions and act effectively to strengthen and reinforce the interior of the cabinet.

The phonograph amplifier 61 is superposed above the radio amplifier 63 seen in Figure 12, and is separated therefrom by the horizontal partition 64. I have deemed it unnecessary to describe in detail the radio apparatus, or the wirings common thereto or to the tubes as any conventional type thereof may be employed, and while I have shown five tubes 49 as being employed in Figure 6, it will be evident that the number of said tubes can be increased or diminished according to requirements. I have omitted the tubes from the back strip 47 seen in Figures 8 to 12 for the sake of clearness of illustration as their positions will be clearly understood from Figure 6. In case the valve 26 is employed, its manipulation can be readily effected by turning the pointer 29 or 41, while in the valveless constructions as seen in Figures 10, 11, 12 and 13, the sound reproductions of either instrument are permitted directly to emerge from their respective amplifiers without requiring any attention on the part of the operator or auditor. In the combined amplifier 65, seen in Figure 13, the phonograph amplifier 66, functions substantially the same as the amplifier 61, seen in Figure 12, and the radio amplifier 67, functions substantially the same as the amplifier, 63 seen in said figure, said amplifiers being separated by the partition 68. By the collocation of the radio and phonograph apparatus in a single cabinet having the conventional appearance of a talking machine cabinet, I am enabled to utilize the space heretofore wasted in these cabinets, both of the upright and console type and combine in a single enclosing cabinet structure both types of any conventional make of radio and talking machine apparatus. In all the amplifier constructions shown, it will be evident that the contour of the same in both longitudinal and transverse cross sections will be such as to conform substantially to the standard approved shapes which will give the best acoustical results, and the general proportions shown may be modified to suit any desired requirements. While the amplifier may be made of any suitable material, I preferably make the body portion of aluminum alloy and I may make the outer front portion of wood, or if desired the latter portion may also form an integral part of the metallic amplifier body.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:

1. In a device of the character stated, a combined motor board and radio panel for a phonograph, radio controls on the top thereof and radio elements on the bottom thereof.

2. In a device of the character stated, a combined motor board, and radio panel for a phonograph, a back strip to the front of which said motor board and panel is hinged, a radio receiver and a tone arm coupling positioned at opposite ends of said strip, radio controls on the upper surface of said motor board, radio elements on the bottom of said panel, and audions mounted on said back strip.

3. A combined radio receiver and phonograph including a supporting panel, a phonograph turn table mounted on one side of said panel and an operating motor on the other side thereof, a radio receiver comprising a plurality of elements with operating handles, said elements being mounted on the same side of the panel as the motor and the operating handles being mounted on the same side of the panel as the turn table.

ALFRED H. HAAG.